US012569723B2

(12) United States Patent
Kowalski

(10) Patent No.: US 12,569,723 B2
(45) Date of Patent: \*Mar. 10, 2026

(54) PICKLEBALLS

(71) Applicant: Selkirk Sport, LLC, Coeur d'Alene, ID (US)

(72) Inventor: William Richard Kowalski, Honolulu, HI (US)

(73) Assignee: Selkirk Sport, LLC, Coeur d'Alene, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/234,686

(22) Filed: Jun. 11, 2025

(65) Prior Publication Data

US 2025/0303239 A1     Oct. 2, 2025

Related U.S. Application Data

(63) Continuation of application No. 18/988,426, filed on Dec. 19, 2024, now Pat. No. 12,357,882.

(60) Provisional application No. 63/621,408, filed on Jan. 16, 2024.

(51) Int. Cl.
*A63B 37/00*        (2006.01)
*A63B 39/00*        (2006.01)
*B29D 22/04*        (2006.01)
*A63B 102/08*       (2015.01)

(52) U.S. Cl.
CPC .......... *A63B 37/0098* (2013.01); *A63B 39/00* (2013.01); *B29D 22/04* (2013.01); *A63B 2102/08* (2015.10)

(58) Field of Classification Search
CPC .. A63B 37/0098; A63B 39/00; A63B 2102/08
See application file for complete search history.

(56) References Cited

U.S. PATENT DOCUMENTS

| | | | |
|---|---|---|---|
| 4,560,168 A | 12/1985 | Aoyama | |
| 5,249,804 A * | 10/1993 | Sanchez ............... | A63B 37/002 473/379 |
| 5,562,552 A * | 10/1996 | Thurman ........... | A63B 37/0004 473/379 |
| 9,592,426 B1 * | 3/2017 | DiPietro ............ | A63B 37/0056 |
| 12,357,882 B1 * | 7/2025 | Kowalski ............... | B29D 22/04 |
| 2011/0275463 A1 * | 11/2011 | Lim ........................ | A63B 39/00 473/613 |
| 2020/0206594 A1 | 7/2020 | Keller | |

(Continued)

OTHER PUBLICATIONS

Office Action for U.S. Appl. No. 18/988,426, dated Apr. 17, 2025, 6 pages.

(Continued)

*Primary Examiner* — John E Simms, Jr.
(74) *Attorney, Agent, or Firm* — Lee & Hayes, P.C.

(57) ABSTRACT

A ball may include a spherical shell, and apertures defined in the spherical shell. The apertures may be formed in the spherical shell based at least in part on a N-frequency tessellation of the spherical shell. A method of forming a ball may include molding a first hemisphere, molding a second hemisphere, and coupling the first hemisphere to the second hemisphere to form a spherical shell. The spherical shell may include apertures defined in the spherical shell based at least in part on a N-frequency tessellation of the spherical shell.

20 Claims, 18 Drawing Sheets

(56)          References Cited

U.S. PATENT DOCUMENTS

2023/0201672 A1*   6/2023   You ................... A63B 37/0098
                                                            473/570
2025/0121257 A1*   4/2025   Haugom ................ B29C 41/04

OTHER PUBLICATIONS

Office Action for U.S. Appl. No. 18/988,426, dated Jan. 30, 2025,
9 pages.
Search Report and Written Opinion for International Application
No. PCT/US2024/061128, Dated Feb. 13, 2025, 10 pages.

* cited by examiner

300

400

Forming a spherical shell
402

Form at least 42
apertures in the spherical
shell based at least on a
n-frequency tessellation
of the spherical shell
404

500

102-N

500

102-N

500

102-N

500

102-N

500

102-N

500

102-N

500

102-N

1200 ⟍

102-N

1200 —

102-N

1200

102-N

1200 ─⮷

102-N

1200 ⟶

102-N

1200 ⟍

102-N

1200

102-N

PICKLEBALLS

CROSS REFERENCE TO RELATED PATENT APPLICATION(S)

This application is a continuation of and claims priority to U.S. patent application Ser. No. 18/988,426, filed Dec. 19, 2024, which claims priority to U.S. Provisional Patent Application No. 63/621,408, filed Jan. 16, 2024, the entirety which are incorporated herein.

TECHNICAL FIELD

The present disclosure relates generally to balls for use in sports and other activities. Specifically, the present disclosure relates to systems and methods for manufacturing pickleball balls including a number of geodesic apertures defined therein that enable play with reduced noise.

BACKGROUND

Different types of sports are ubiquitously engaged in by participants for various reasons including to improve health, for leisure and enjoyment, and for competitive or professional purposes, among other reasons. One such sport that is quickly becoming a popular sport is pickleball. Pickleball is an indoor or outdoor paddle sport in which two (singles) or four (doubles) players hit a perforated, hollow plastic ball with paddles over a 34-inch-high net until one side is unable to return the ball or commits an infraction.

The perforated, hollow plastic ball may include a durable material that can withstand hours of play without cracking or breaking. Further, unlike in other sports such as wiffle ball that utilize a perforated ball, a pickleball may include perforations or apertures defined around an entirety of the surface of the pickleball to ensure that the pickleball does not rise or curve when struck with a paddle. The perforations further allow for compression of the pickleball to occur when struck by a paddle or when striking the ground. However, some pickleballs include perforations defined in their surfaces that cause the pickleball to be unevenly weighted to one side, provide for too much material or too little material to be present at a given point along the surface of the pickleball, or otherwise are non-uniform in their construction. This non-uniformity may lead to the pickleball deviating from an expected flight path when hit by a paddle or hit at the ground. This unexpected deviation in flight may also be experienced when a player seeks to intentionally place a spin on the pickleball when striking the pickleball.

Further, many pickleballs, when struck with a pickleball paddle or when struck against a hard surface, produce a sharp popping sound that is loud enough to create a nuisance. The constant sound during play has generated conflict between pickleball court owners and nearby property owners including residential property owners. The noise, combined with the rapid rise in the popularity of pickleball has resulted in an intense backlash against the sport in communities across the world. Some municipalities have even instituted bans on the play of pickleball citing the inability of some neighbors to hold conversations inside their residences, general discord in the area, and even physically debilitating stress allegedly due to the noise from the pickleball play.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
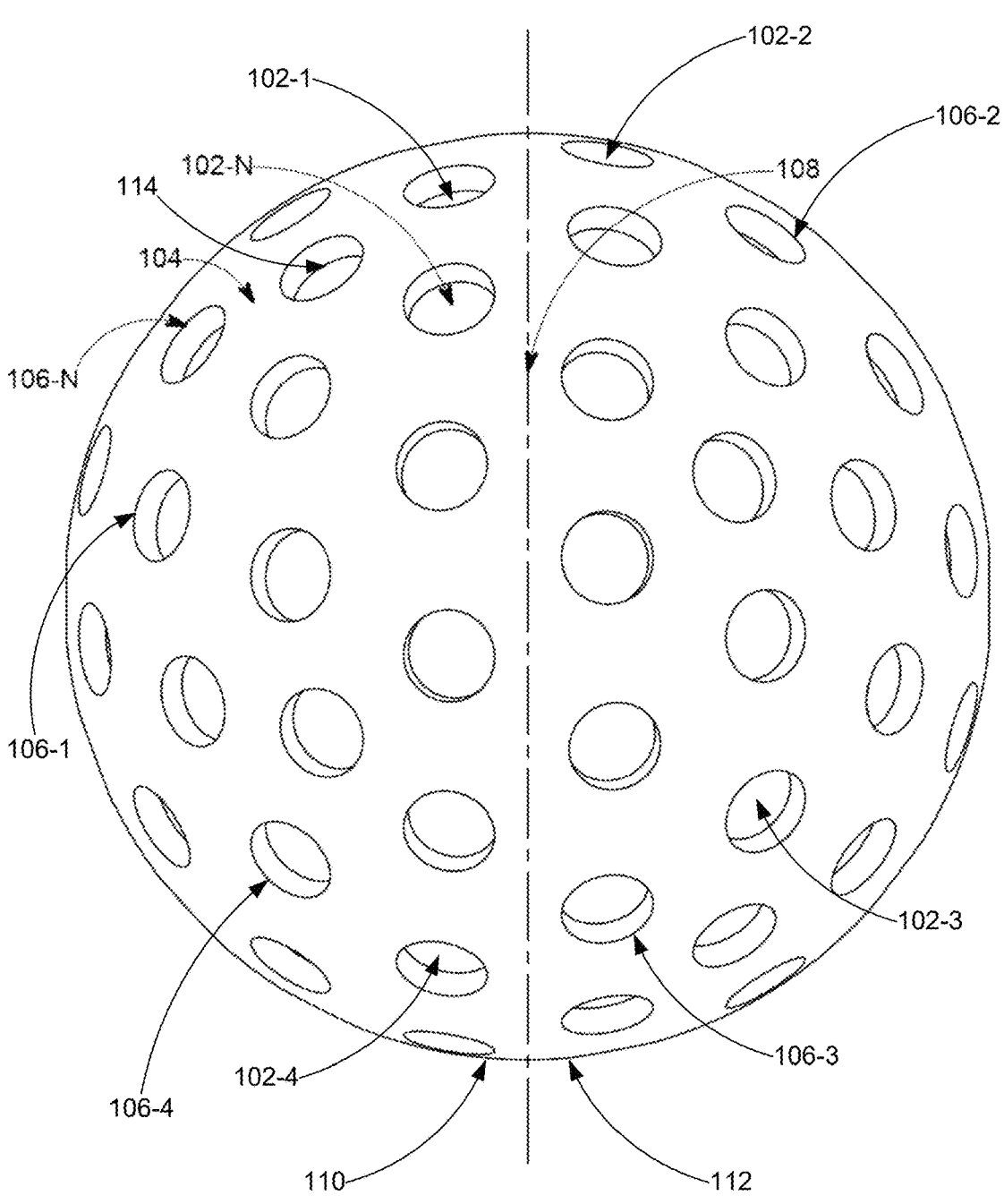
FIG. 1 illustrates a perspective view of a pickleball including a plurality of apertures defined therein, according to an example of the principles described herein.

Pickleball is a ball and paddle sport that combines elements of tennis, badminton, and ping-pong using a paddle and hollow plastic ball with holes or apertures defined in the hollow plastic ball. The sport was conceived in 1965 in Bainbridge Island, Washington. Pickleball has rapidly gained acceptance in recent years. Some reasons why pickleball has become so popular are because pickleball is easy to play, is a low impact sport for all ages of participants, and the game play appeals to a wide range of people including people ranging from children to senior citizens. Further, pickleball provides an opportunity for participants to socialize within a community. The popularity of pickleball burst into the mainstream with the USA Pickleball Association's membership reaching 10,000 in 2015 with as many as 2 million playing nationwide at that time. The number of individuals playing pickleball grew by 159% over three years to 8.9 million in 2022. It is estimated that the pickleball equipment market reached a value of $518.98 million in 2022 and is projected to reach $1,063.66 million by 2030, growing at a compound annual growth rate (CAGR) of 9.52% from 2024 to 2030. Today, pickleball is the fastest growing sport in North America.

Current pickleballs may have between 26 and 40 apertures (e.g., holes). No pickleballs present in the industry have more than 40 holes due to industry and/or a governing body's equipment specifications. Further, pickleballs may be made of a durable molded material, including but not limited to types of polyethylene (PE). The dimensions of the pickleball may be approximately between 2.87 inches (7.29 cm) and 2.97 inches (7.54 cm) in diameter. The weight of the pickleball may be approximately between 0.78 ounces and 0.935 ounces (between 22.1 and 26.5 grams). Pickleballs may be formed through injection molding processes, roto-molding processes, or other processes. A disadvantage of all pickleballs to date is that the pickleballs make excessive noise when the pickleball ball contacts with a pickleball paddle, court surfaces, or other surfaces. Noise complaints about pickleball have led to neighborhood disturbances, quarrels, and even lawsuits.

In fact, pickleball decibel levels from 100 feet away may reach upwards of 70 A-weighted decibels (dBA); an expression of the relative loudness of sounds as perceived by the human car. A-weighting is applied to instrument-measured sound levels in an effort to account for the relative loudness perceived by the human car, as the car is less sensitive to low audio frequencies, and is the standard for determining hearing damage and noise pollution. There have been comments that the constant sharp popping sounds are a torture to individuals nearby pickleball gameplay, and that such a nuisance cannot be escaped, even with windows closed and a television or other audio device set at a high volume. It has been asserted that this nuisance may further lead to loss of sleep and increases in anxiety among players and bystanders alike. Thus, there is a need for new systems and methods to provide a pickleball that, when played with, has a reduced noise while still providing superior playability. Many methods have been attempted to reduce the noise of pickleballs. For example, foam balls that reduce noise have been contemplated. However, these balls are rubbery, bouncy, and do not retain the intended performance, and are considered by most not suitable for pickleball play.

As used in the present specification and in the appended claims, the term "geodesic" is meant to be understood broadly as any shortest path between two points on a surface. A geodesic dome may include any hemispheric structure that is based on a geodesic polyhedron. In the context of the example pickleballs described herein, apertures defined in the surface of the pickleball may be defined at positions along a surface of the pickleball (e.g., a spherical object with an outer surface) at which geodesic lines intersect at vertices.

Examples described herein provide a ball including a spherical shell and apertures defined in the spherical shell. The apertures are formed in the spherical shell based at least in part on an N-frequency tessellation of the spherical shell, where N is a whole number.

The apertures may include between 26 and 40 apertures. The apertures may include at least 42 apertures. The apertures may include at least 66 apertures. The apertures may include at least 80 apertures. The apertures may include at least 92 apertures. The apertures may include apertures having a same diameter. The apertures may include apertures having a same diameter have a diameter of approximately 7.5 mm.

In one example, the apertures may include apertures having a same diameter have a diameter of approximately 7.5 mm. However, the apertures having a same diameter may have any diameter including less than or greater than 7.5 mm. In this example, the distances between apertures defined in the pickleball may vary between approximately 15% and 20%. However, any distances between the apertures may be defined based on the N-frequency tessellation of the spherical shell of the pickleball.

In one example, the apertures may include at least two different classes of apertures having at least two different diameters. The at least two different diameters of the at least two different classes of apertures may include diameters of apertures based at least in part on a distance between centers of the apertures. The at least two different diameters of apertures may include a first aperture diameter having a diameter of 8.8 mm and a second aperture diameter having a diameter of 7.2 mm. The at least two different classes of apertures having the at least two different diameters may include a third class of aperture having a diameter of between 7.9 mm and 8.1 mm. The apertures may have equal spacing between edges of neighboring apertures. The apertures may be geodesic. The N-frequency tessellation of the spherical shell may include a 3-frequency tessellation of the spherical shell. The apertures may include pairs of apertures wherein a first aperture of a first pair of apertures is axially aligned with a second aperture of the first pair of apertures through a center of the ball.

Examples described herein also provide a method of forming a ball, including molding a first hemisphere, molding a second hemisphere, and coupling the first hemisphere to the second hemisphere to form a spherical shell. The spherical shell may include apertures defined in the spherical shell based at least in part on a N-frequency tessellation of the spherical shell, where N is a whole number. The coupling of the first hemisphere to the second hemisphere is performed via welding. The apertures may include less than 42 apertures, at least 42 apertures, at least 66 apertures, at least 80 apertures, or at least 92 apertures. The apertures may include apertures having a same diameter. The apertures may include apertures having a same diameter that have a diameter of approximately 7.5 mm.

The apertures may include at least two different classes of apertures having at least two different diameters. The at least two different diameters of the at least two different classes of apertures include diameters of apertures based at least in part on a distance between centers of the apertures. The at least two different diameters of apertures may include a first aperture diameter having a diameter of 8.8 mm and a second aperture diameter having a diameter of 7.2 mm. The at least two different classes of apertures having the at least two different diameters may include a third class of aperture having a diameter of between 7.9 mm and 8.1 mm. The apertures may have equal spacing between edges of neighboring apertures. The apertures may be geodesic. The apertures may include pairs of apertures wherein a first aperture of a first pair of apertures is axially aligned with a second aperture of the first pair of apertures through a center of the ball.

The N-frequency tessellation of the spherical shell may include a 3-frequency tessellation of the spherical shell. The spherical shell may include at least one of thermoplastic elastomers (TPE), ethylene-vinyl acetate (EVA), polypropylene (PP), polyethylene (PE), low-density polyethylene (LDPE), high-density polyethylene (HDPE), linear low-density polyethylene (LLDPE), polyurethane (PU), thermoplastic polyurethane (TPU), and combinations thereof.

Examples described herein also provide a method of forming a ball including forming a spherical shell and forming apertures in the spherical shell based at least in part on a N-frequency tessellation of the spherical shell, where N is a whole number.

EXAMPLE EMBODIMENTS

This disclosure describes techniques for pickleball design and manufacturing. This disclosure describes pickleballs that include uniform features that provide an expected flight path when struck or when hit at a surface such as the ground with a reduction in the sharp popping sounds produced when struck. The pickleballs described herein may include a number of geodesic perforations or apertures defined in the surface of the pickleballs. The pickleballs described herein decrease noise levels of the pickleballs when the pickleballs are struck with, for example, a paddle, or strike a surface such as, for example, a playing surface. Noise reduction may be due to an increase in a number of apertures defined in the pickleballs, the geodesic layout of the apertures as defined in the pickleballs, the size(s) of the apertures defined within the pickleballs, and combinations thereof. Further, these aspects of the pickleballs may increase lift of the pickleballs when struck, decrease in drag of the pickleballs during flight, and may provide for a more consistent flight during play.

Certain implementations and examples of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a perspective view of a pickleball 100 including a plurality of apertures 102-1, 102-2, 102-3, 102-4, 102-N (where N is any integer greater than or equal to 1 (collectively referred to herein as aperture(s) 102 unless specifically addressed otherwise)) defined therein, according to an example of the principles described herein. In one example, the pickleball 100 may have a diameter of between 70 mm and 80 mm. In one example, the pickleball 100 may have a diameter of 75 mm. However, In one example, the pickleball 100 may have a diameter defined by a standard or rule such as, for example, a standard or rule set forth by a governing body such as the USA Pickleball (USAP) or other national or international governing body for the sport of pickleball.

In one example, the pickleball 100 may include an outer surface 104 and an inner surface 114, and may include a hollow, spherical shell into which the apertures 102 may be defined (e.g., formed). The thickness of the hollow, spherical shell may include any thickness as defined by a distance between the outer surface 104 and an inner surface 114. In one example, the N-number of apertures 102 may include any number of apertures such as, for example, between 26 and 40 apertures, less than 42 apertures 102, or at least 42 apertures 102. In one example, the N-number of apertures 102 may include at least 66 apertures. In one example, the N-number of apertures 102 may include at least 80 apertures. In one example, the N-number of apertures 102 may include at least 92 apertures. However, in the examples described herein, the N-number of apertures 102 may include any number of apertures.

Each of the apertures 102 may include an edge 106-1, 106-2, 106-3, 106-4, 106-N (where N is any integer greater than or equal to 1 (collectively referred to herein as edge(s) 106 unless specifically addressed otherwise)) that may be used to define an extent of the apertures 102. The apertures 102 may have diameters defined by the edges 106. In one example, the apertures 102 may have a diameter of between 7.0 mm and 9.0 mm. In one example, the apertures 102 may have a diameter of 7.2 mm, 7.9 mm, 8.0 mm, 8.1 mm, 8.8 mm, or other diameters.

In one example, the apertures 102 may include apertures having a same diameter and may have, in one example, a diameter of approximately 7.5 mm. However, the apertures 102 having a same diameter may have any diameter including less than or greater than 7.5 mm. In this example, the distances between apertures 102 defined in the pickleball may vary between approximately 15% and 20%. However, any distances between the apertures 102 may be defined based on the N-frequency tessellation of the spherical shell of the pickleball as described herein.

In one example, the apertures 102 may include at least two different classes of apertures having at least two different diameters. The inclusion of apertures 102 including at least two different classes of apertures which may have the at least two different diameters allow for more or less material to be removed from the pickleball 100 as a whole, and/or at designated portions of the outer surface 104 of the pickleball 100. Varying the diameters of the apertures 102 in this manner may assist in reducing noise as the pickleball 100 is struck or strikes a surface. Further, in one example, the at least two different diameters may allow for a more consistent flight of the pickleball 100, an increase in lift of the pickleballs 100 when struck, and/or a decrease in drag of the pickleballs 100 during flight.

In one example, the at least two different diameters of apertures 102 may include a number of first apertures having a diameter of approximately 8.8 mm and a number of second apertures having a diameter of approximately 7.2 mm. Further, in one example, the at least two different classes of apertures including the at least two different diameters may include a third class of aperture having a diameter of between 7.9 mm and 8.1 mm. Any number of classes of apertures may be defined in the outer surface 104 of the pickleball 100 with a corresponding number of different diameters.

In one example, the at least two different diameters of the at least two different classes of apertures 102 may include diameters of apertures 102 that are sized based at least in part on a distance between centers of the apertures 102. Further, in one example, the apertures 102 may be defined in the outer surface 104 of the pickleball 100 such that the apertures 102 are equally spaced along the outer surface 104 of the pickleball 100. In one example, the apertures 102 may be spaced from one another as defined in the pickleball 100 such that edges 106 of the apertures 102 may be equal from neighboring apertures 102. More regarding the layout of the apertures 102 along the outer surface 104 of the pickleball 100 is described herein in connection with FIG. 2.

The pickleball 100 may further include an equator 108 defined about a circumference of the pickleball 100. The equator 108 may define a point along a circumference of the pickleball 100 where no aperture 102 is defined. In one example, the pickleball 100 may be manufactured by forming two separate hemispheres including a first hemisphere 110 and a second hemisphere 112. The first hemisphere 110 and the second hemisphere 112 may be coupled to one another via mechanical fastening, adhesive bonding, welding and combinations thereof. For example, a manufacturing method used to couple the first hemisphere 110 and the second hemisphere 112 together may include, for example, gluing, application of solvents and/or adhesives, via use of fasteners, chemical welding, friction welding, hot-gas welding, speed tip welding, high-frequency welding, laser welding, extrusion welding, vibration welding, solvent welding, hot-plate welding, induction welding, ultrasonic welding, infrared welding, overmolding, other plastic coupling manufacturing processes, and combinations thereof.

In a scenario where the couple the first hemisphere 110 and the second hemisphere 112 are formed separately and then coupled to one another, the couple the first hemisphere 110 and the second hemisphere 112 may be separately formed via any number of manufacturing processes such as, for example, plastic extrusion, injection molding, rotational molding, plastic extrusion and injection blow molding, vacuum casting, thermoforming and vacuum forming, compression molding or other forms of plastic manufacturing.

In one example, the first hemisphere 110 and the second hemisphere 112 may be monolithically formed at the time of manufacture rather than forming two separate hemispheres for later coupling of the hemispheres are described above. In this example, the pickleball 100 may be formed via any number of manufacturing processes such as, for example, plastic extrusion, injection molding, rotational molding, plastic extrusion and injection blow molding, vacuum casting, thermoforming and vacuum forming, compression molding or other forms of plastic manufacturing. Further, in one example where the pickleball 100 is monolithically formed, the apertures 102 may be precision drilled into the pickleball 100 at locations as described and depicted herein. In this manner, the pickleball 100 may still include the equator 108, but the equator 108 may not be formed via the coupling of the first hemisphere 110 to the second hemisphere 112 but, instead, through the forming the apertures 102 in locations other than at the equator 108.

Figure 2:
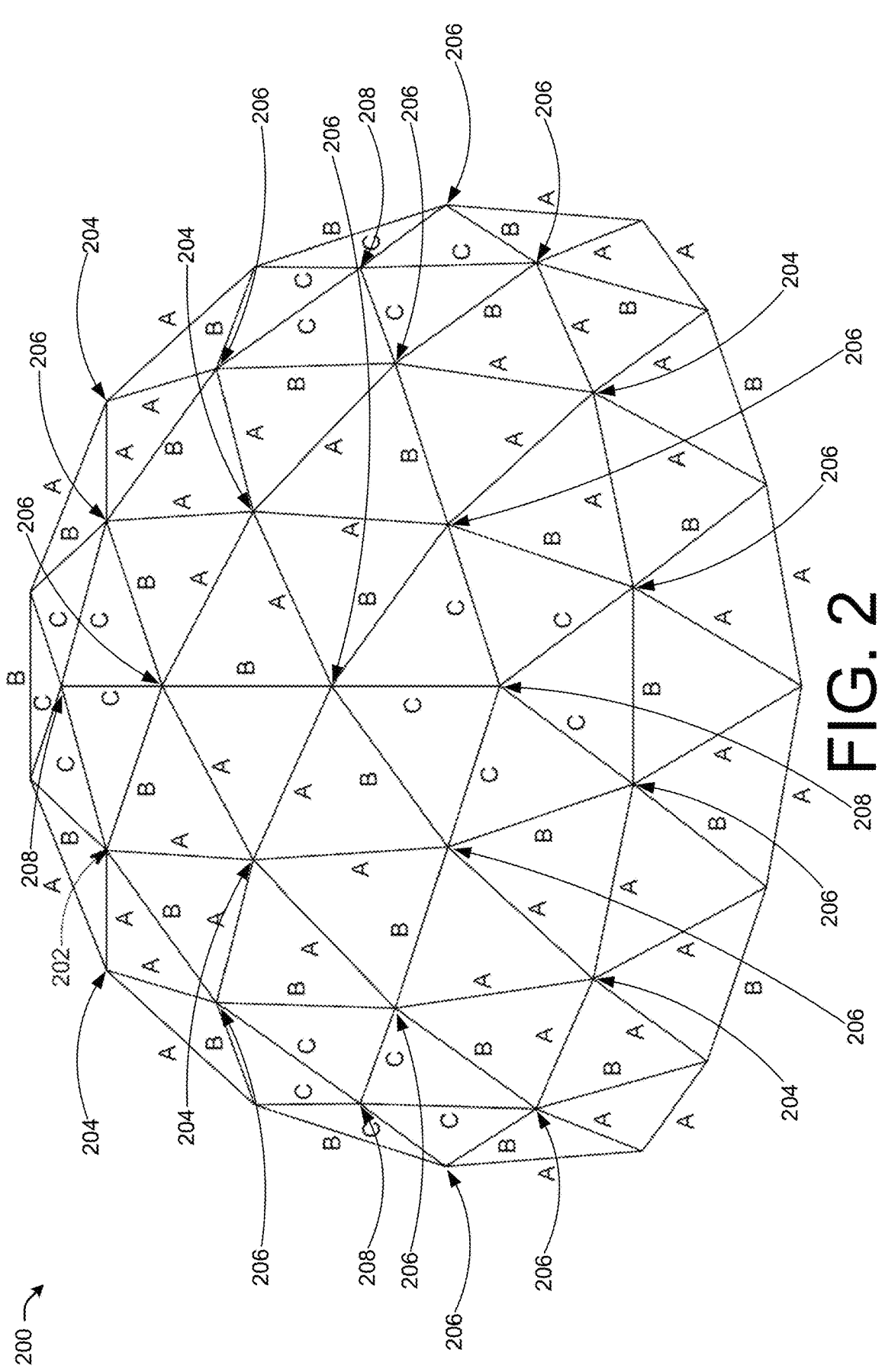
FIG. 2 illustrates a dome including a three-frequency tessellation including a plurality of intersecting vertices, according to an example of the principles described herein.

In order to more fully understand the formation of the apertures 102 in the pickleball including along a surface of the first hemisphere 110 and the second hemisphere 112, the concepts described herein in connection with FIG. 2 may be used to determine the locations and numbers of the apertures 102. In one example, the apertures 102 formed in the first hemisphere 110 and the second hemisphere 112 may be identical to one another such that the locations and numbers of apertures 102 formed in the first hemisphere 110 may be identical or near identical to the apertures 102 formed in the second hemisphere 112. In one example, the apertures 102 formed in the first hemisphere 110 and the apertures formed in the second hemisphere 112 may be formed such that each of the apertures 102 formed in the first hemisphere 110 align with the apertures 102 formed in the second hemisphere 112 through a center of the pickleball 100. Stated another way, a first aperture 102 formed in the first hemisphere 110 may align with a second aperture 102 formed on the second hemisphere 112 through a center of the pickleball 100 (e.g., a single point within the sphere of the pickleball 100 that is the same distance from every point on the surface of sphere of the pickleball 100). Thus, the apertures 102 may include pairs of apertures 102 where a first aperture 102 of a first pair of apertures 102 is axially aligned with a second aperture 102 of the first pair of apertures 102 through a center of the pickleball 100. In this manner, the pickleball 100 includes an equal amount of material at any first point on the outer surface 104 as compared to a second point on the outer surface 104 opposite the first point. With this material equalization on opposite sides of the pickleball 100, the pickleball 100 has an increased consistency in flight.

FIG. 2 illustrates a dome 200 including a three-frequency tessellation including a plurality of intersecting vertices, according to an example of the principles described herein. The dome 200 may represent a hemisphere of a pickleball 100. Further, FIG. 2 depicts a geodesic polyhedron defined over the dome 200. A geodesic polyhedron is a convex polyhedron made from triangles through tessellation of the surface of the dome 200. The geodesic polyhedron may have icosahedral symmetry such that they have six triangles at a vertex, except twelve vertices which have five triangles. Geodesic polyhedra are a good approximation to a sphere and may be used to represent hemispherical architectural structures such as the geodesic dome 200 depicted in FIG. 2. Thus, in one example, as depicted in FIG. 2, the dome 200 may represent one half of a spherical ball where the 92 vertices that intersect (e.g., intersecting lines) within the three-frequency tessellation of the sphere represent or define positions where apertures 102 may be formed in the pickleball 100.

Although FIG. 2 depicts a three-frequency tessellation of a hemisphere of a sphere, any N-frequency tessellation may be applied to the hemisphere. The dome 200 and the associated N-frequency tessellation may be used to determine the location and/or number of apertures 102 defined in the pickleball 100 during manufacturing processes. For example, the N-frequency tessellation of the dome 200 may form a number of intersecting line segments where the intersections 202 of the line segments indicate where centers of the apertures 102 are to be formed. In other words, the pickleball 100 may include apertures 102 with center-points substantially located at the intersections 202 of the line segments of the N-frequency tessellation (e.g., a three-frequency geodesic pattern).

In one example, the N-frequency tessellation of the dome 200 may include lines of different lengths along the sides of the various triangle shapes formed through the N-frequency tessellation. In FIG. 2, the intersecting lines are designated as "A" lines, "B" lines, and "C" lines. In one example, A lines may be longer than the B lines, and B lines may be longer than C lines. This provides a pattern for which the apertures 102 may be formed in the outer surface 104.

As described herein, in one example, the apertures may include apertures having a same diameter of approximately 7.5 mm. However, the apertures having a same diameter may have any diameter including less than or greater than 7.5 mm. In this example, the distances between apertures defined in the pickleball may vary between approximately 15% and 20%. However, any distances between the apertures may be defined based on the N-frequency tessellation of the spherical shell of the pickleball.

In one example, the pattern for which the apertures 102 may be formed in the outer surface 104 may include at least two different classes of apertures 102 having at least two different diameters are described herein. As depicted in FIG. 2, the intersections may be classified into, for example, three different classifications. A first classification may be an intersection 202 where A lines converge at an intersection that may be referred to herein as A intersections 204. A second classification may be an intersection 202 where A lines, B lines, and/or C lines converge at an intersection 202 that may be referred to herein as A, B, C intersections 206. A third classification may be an intersection 202 where C lines converge at an intersection that may be referred to herein as C intersections 208. In order to maintain an amount of material evenly on all sides of the pickleball 100 so that the weight of the pickleball 100 is uniform about an entirety of the pickleball 100 and maintain or increasing consistency in flight while still removing material to allow for reduced noise when the pickleball strikes a surface, the apertures 102 may include the at least two different diameters. In the example of FIG. 2, the at least two different classes of apertures 102 may include three different classes of apertures 102 with a corresponding three different diameters of apertures 102.

In one example, the three different classes of apertures 102 with the corresponding three different diameters of apertures 102 may include a first class of apertures 102 that include a first aperture diameter having a diameter of approximately 8.8 mm, a second class of apertures 102 that include a second aperture diameter having a diameter of approximately 7.2 mm, and a third class of apertures 102 that include a third aperture diameter having a diameter of approximately between 7.9 mm and 8.1 mm. It is noted that the above-listed diameters of the first, second, and third classes of apertures 102 are only examples, and that the number of classes of apertures 102 may have relatively smaller or larger diameters than the examples described herein. Further, in the examples described herein, the third class of apertures may include an intermediate diameter that is relatively smaller than the first class of apertures 102 and relatively larger than the second class of apertures 102.

Because the A lines are longest and represent a furthest distance from other intersections 202 of lines, relatively larger apertures 102 that have edges 106 that extend further away from the A intersections 204 may be formed at the A intersections 204. Similarly, because the C lines are shortest and represent a shortest distance from other intersections 202 of lines, relatively smaller apertures 102 that have edges 106 that extend least furthest away from the C intersections 208 may be formed at the C intersections 208. Further, B lines are of an intermediate length relative to the A lines and the C lines and represent an intermediate distance from other intersections 202 of lines. Thus, intermediate apertures 102 that have edges 106 that extend relatively less further away from the A, B, C intersections 206 as compared to apertures 102 formed at the A intersections 204 and that extend relatively further away from the A, B, C intersections 206 as compared to apertures 102 formed at the C intersections 208 may be formed at the A, B, C intersections 206.

In one example, the first class of apertures 102 that include the first aperture diameter having a diameter of approximately 8.8 mm may be formed at the A intersections 204. Further, in one example, the second class of apertures 102 that include the second aperture diameter having a diameter of approximately 7.2 mm may be formed at the C intersections 208. Further, because the A, B, C intersections 206 include A lines, B lines, and/or C lines and represents an intermediate distance from other intersections 202 of lines as compared to A intersections 204 and C intersections 208, an intermediate size of apertures 102 that have edges 106 that extend relatively longer distances from the A, B, C intersections 206 as compared to the C intersections 208 and relatively shorter distances from the A, B, C intersections 206 as compared to the A intersections 204 may be formed at the A, B, C intersections 206. In one example, the third class of apertures 102 that include the third aperture diameter may have a diameter of approximately between 7.9 mm and 8.1 mm and may be formed at the A, B, C intersections 206. In this manner, an amount of material between all the three different classes of apertures may be uniform. Having uniform or equivalent material around the surface of the pickleball 100 increases the balance of the pickleball 100 and, in turn, increases consistency in flight of the pickleball 100 during play.

The dome 200 of FIG. 2 may provide for a pattern via which at least 42 apertures may be formed in a hemisphere of a pickleball 100. In one example, the dome 200 of FIG. 2 may provide a pattern that defines where within a pickleball 100 a number of apertures 102 including 42, 66, 80, 92, or other numbers of apertures 102 within two hemispheres of the pickleball 100 may be formed.

Figure 3:
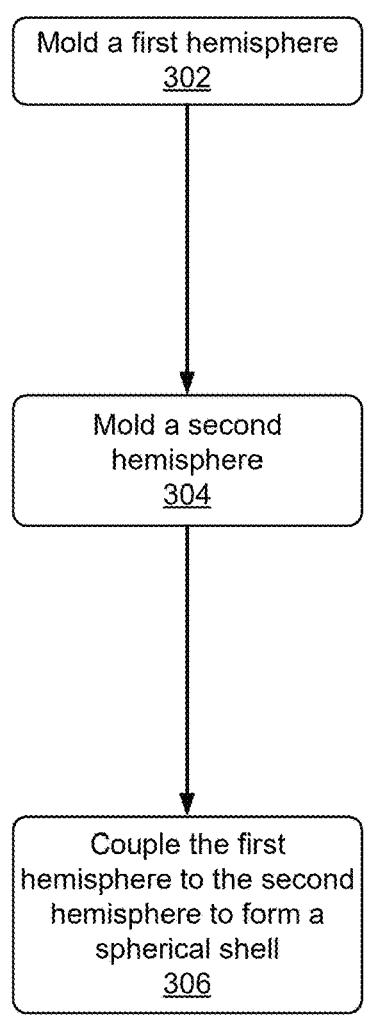
FIG. 3 illustrates a flow diagram of an example method of forming a pickleball, according to an example of the principles described herein.

FIG. 3 illustrates a flow diagram of an example method 300 of forming a pickleball 100, according to an example of the principles described herein. The method 300 of FIG. 3 may include, at 302, molding a first hemisphere (e.g., FIG. 1, 110) of the pickleball 100. At 304, the method 300 may further include molding a second hemisphere (e.g., FIG. 1, 112) of the pickleball 100. At 302 and 304, the first hemisphere (e.g., FIG. 1, 110) and the second hemisphere (e.g., FIG. 1, 112) may be molded via any manufacturing method described herein, and include apertures 102 at the positions and diameters as described herein and defined by the dome 200 of FIG. 2.

At 306, the first hemisphere (e.g., FIG. 1, 110) and the second hemisphere (e.g., FIG. 1, 112) may be coupled to one another to form a spherical shell. The first hemisphere (e.g., FIG. 1, 110) and the second hemisphere (e.g., FIG. 1, 112) may be coupled to one another utilizing any of the mechanical fastening, adhesive bonding, and welding processes described herein, and combinations thereof. Further, the spherical shell may include at least 42 apertures defined in the spherical shell based at least in part on the N-frequency tessellation of the spherical shell as described herein.

Figure 4:
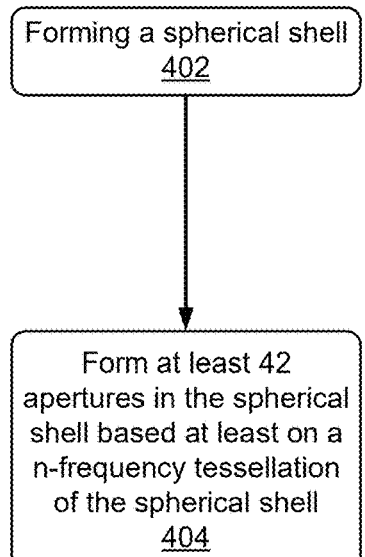
FIG. 4 illustrates a flow diagram of an example method of forming a pickleball, according to an example of the principles described herein.
Figure 5:
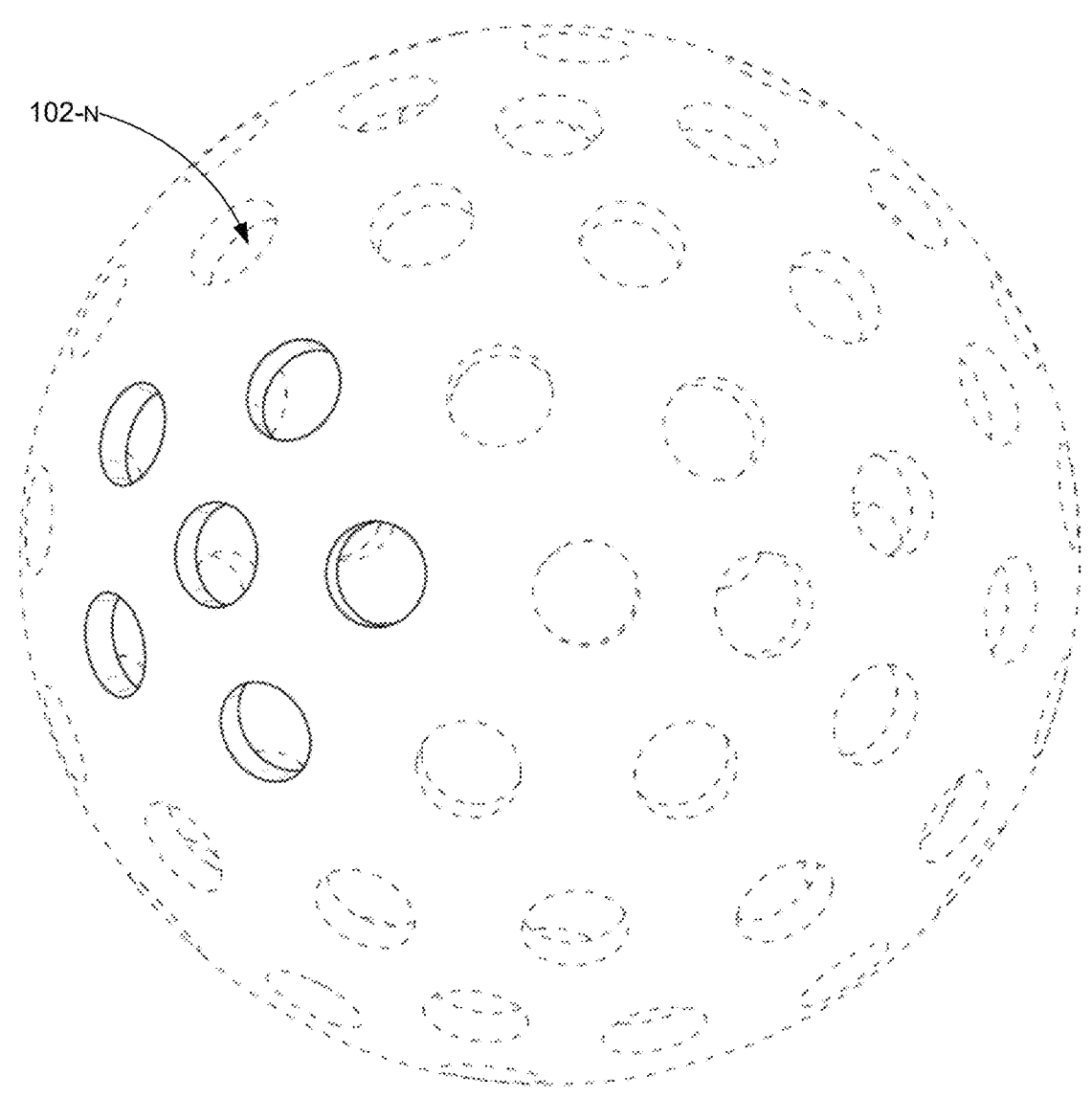
FIGS. 5 through 11 illustrate a number of perspective views of a pickleball including a plurality of apertures defined therein, according to an example of the principles described herein.
Figure 6:
Figure 7:
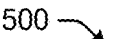
Figure 8:
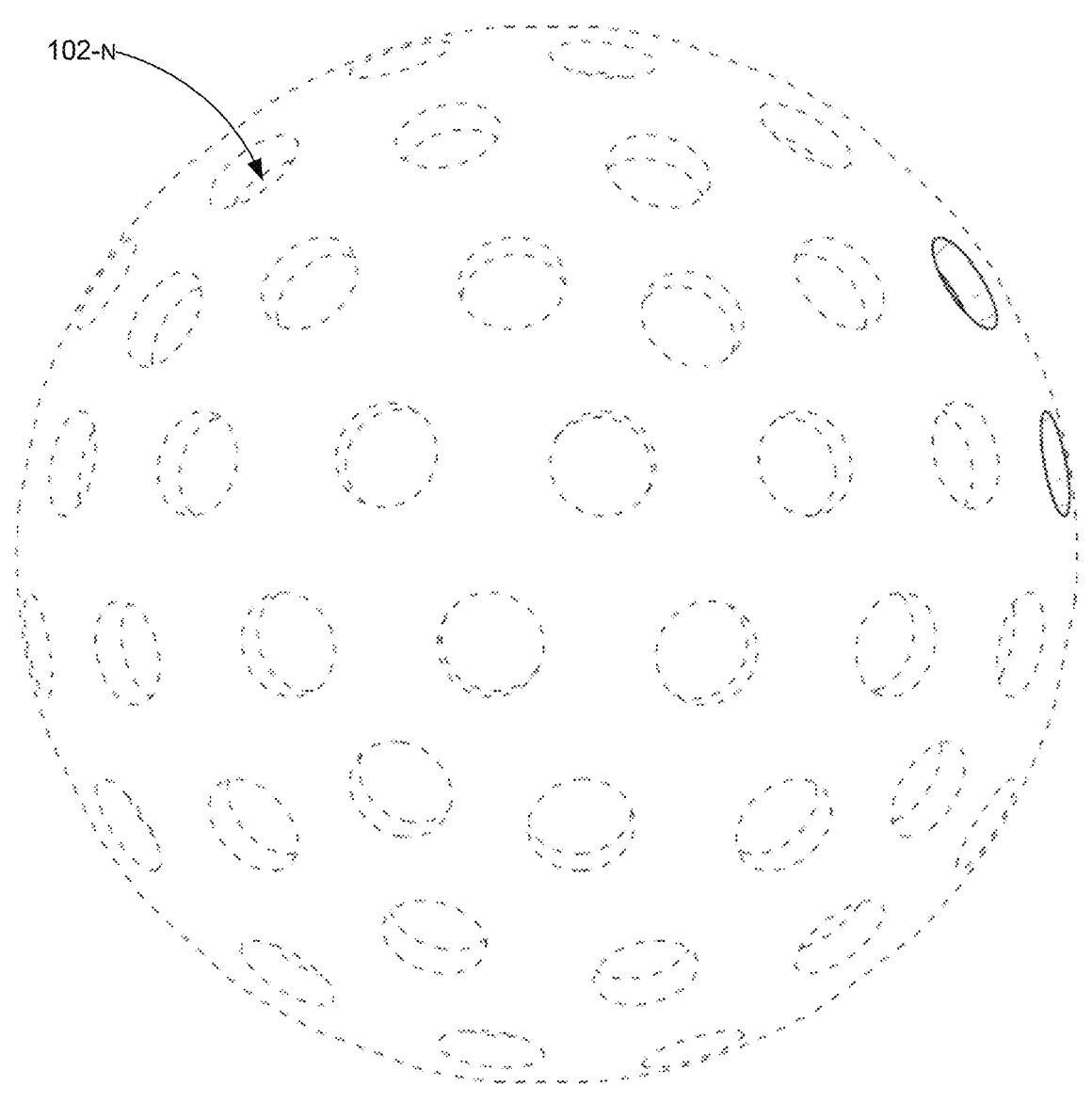
Figure 9:
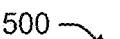
Figure 10:
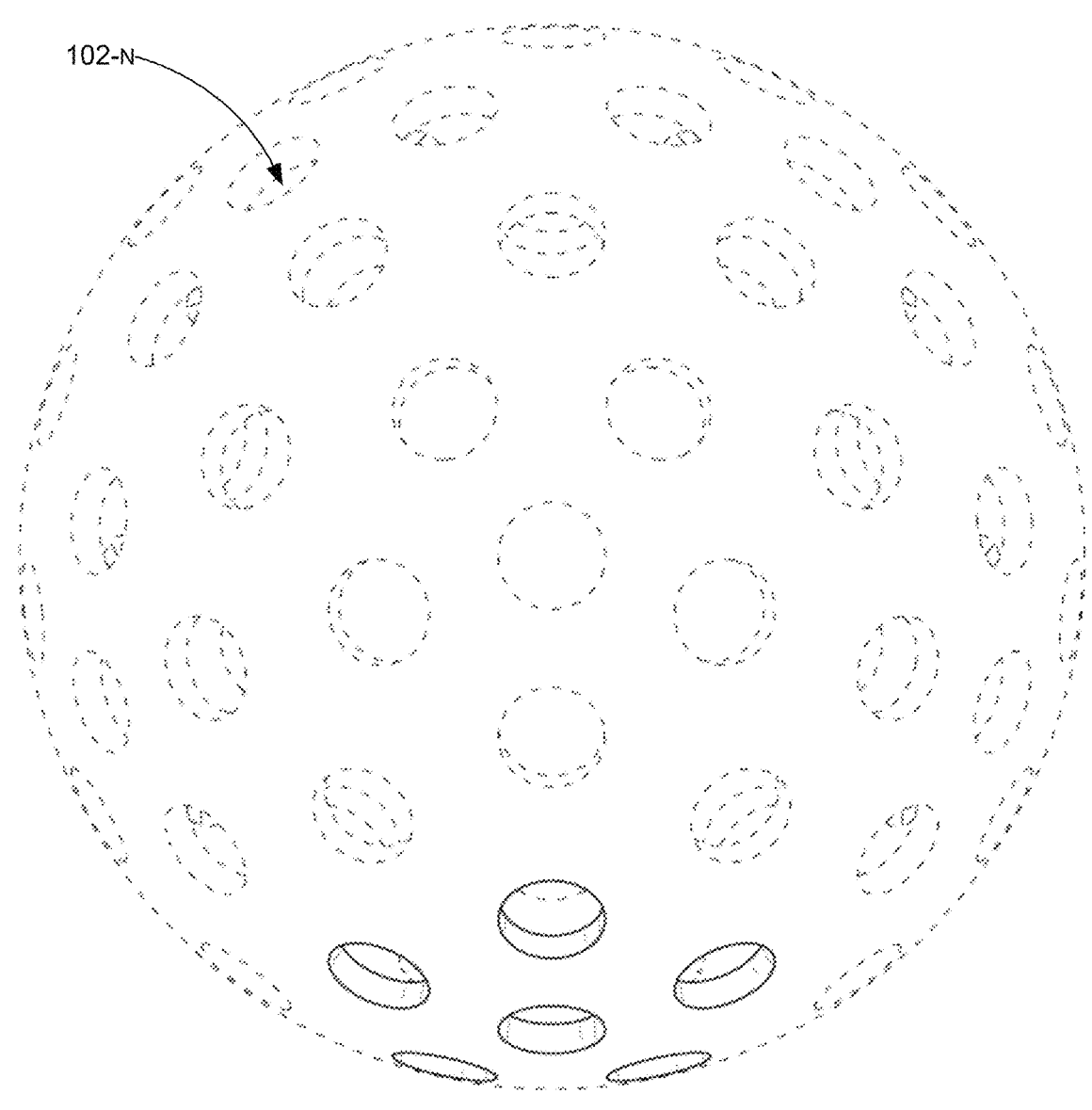
Figure 11:
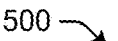
Figure 12:
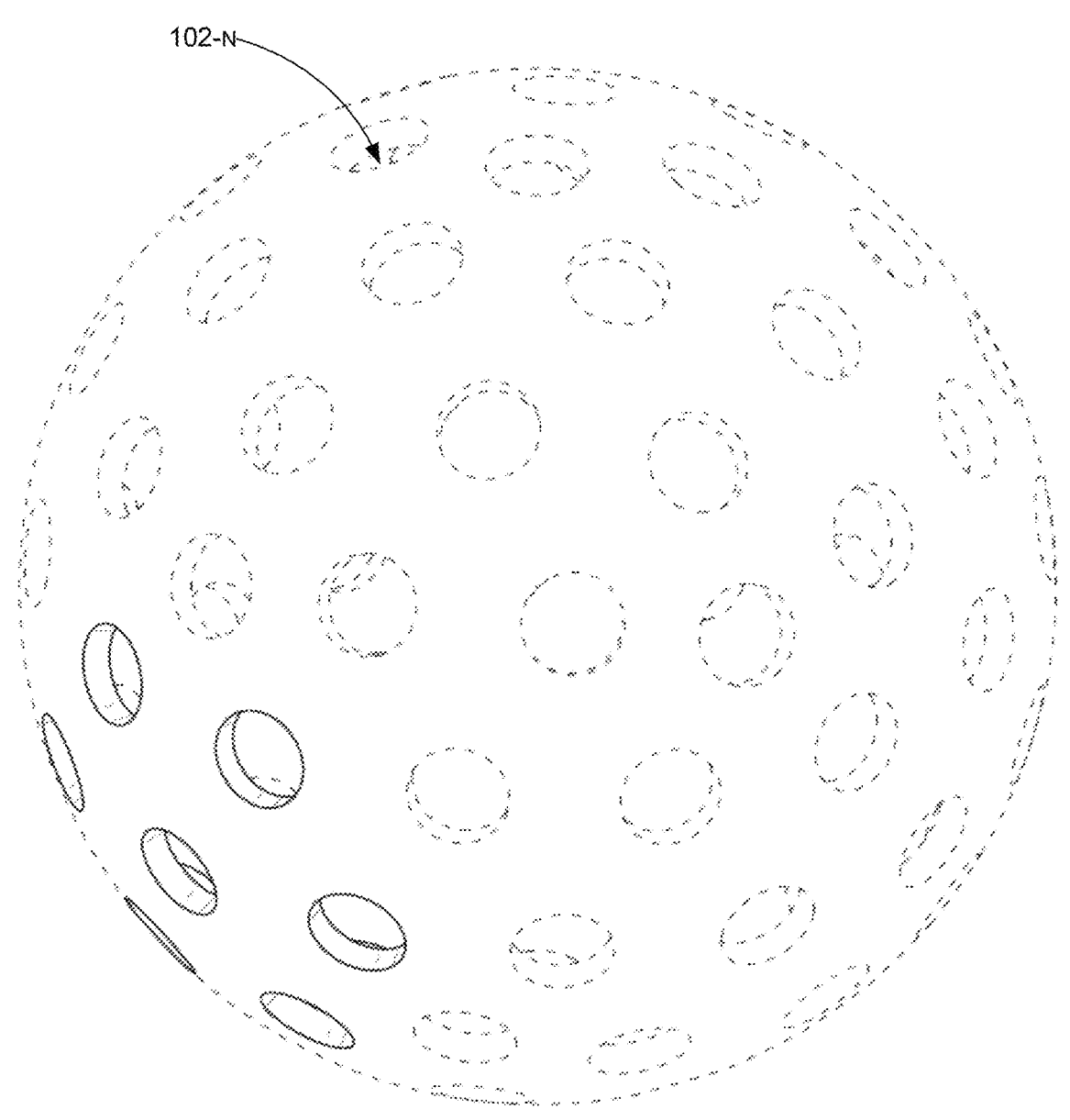
FIGS. 12 through 18 illustrate a number of perspective views of a pickleball including a plurality of apertures defined therein, according to an example of the principles described herein.
Figure 13:
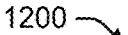
Figure 14:
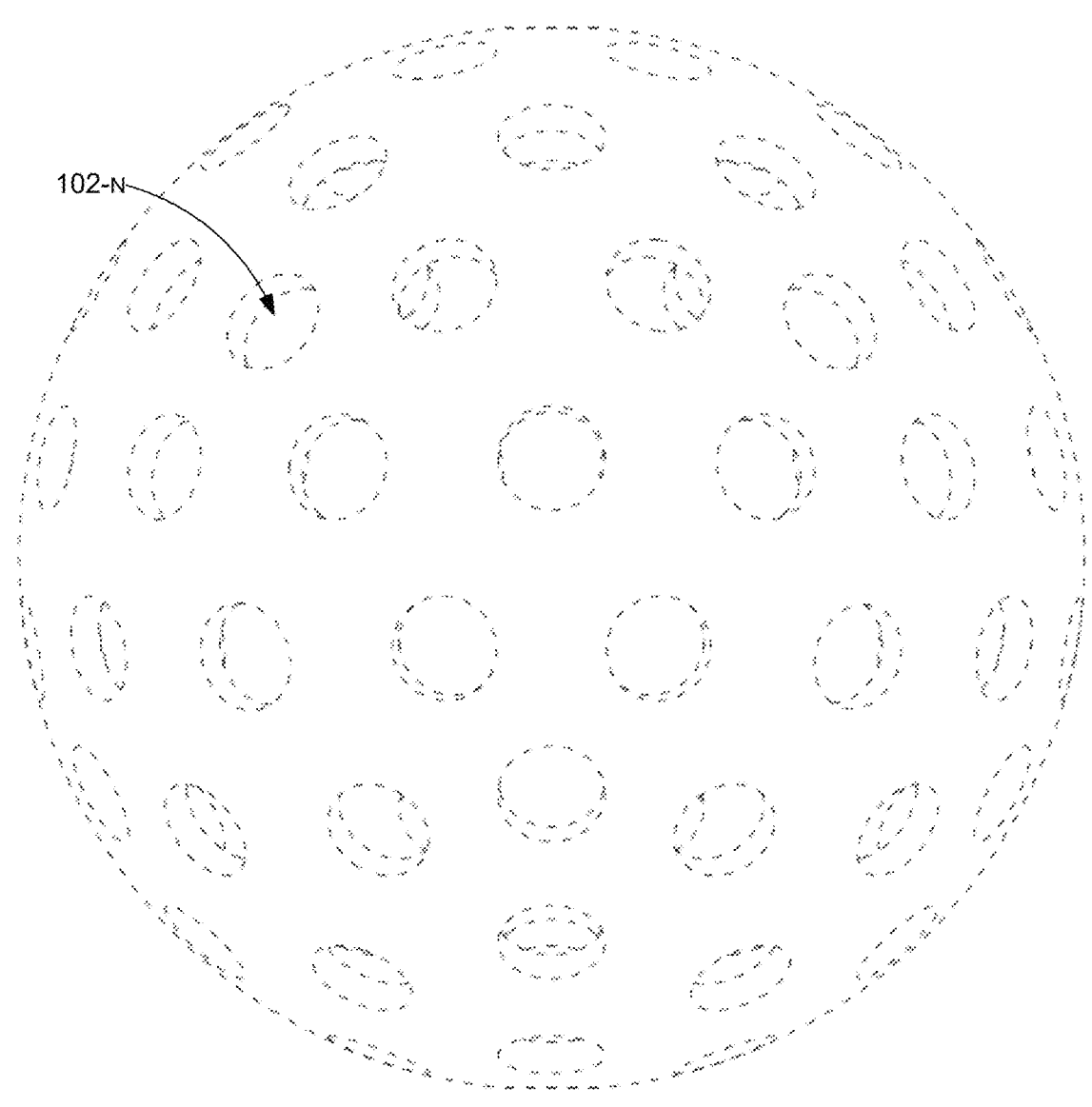
Figure 15:
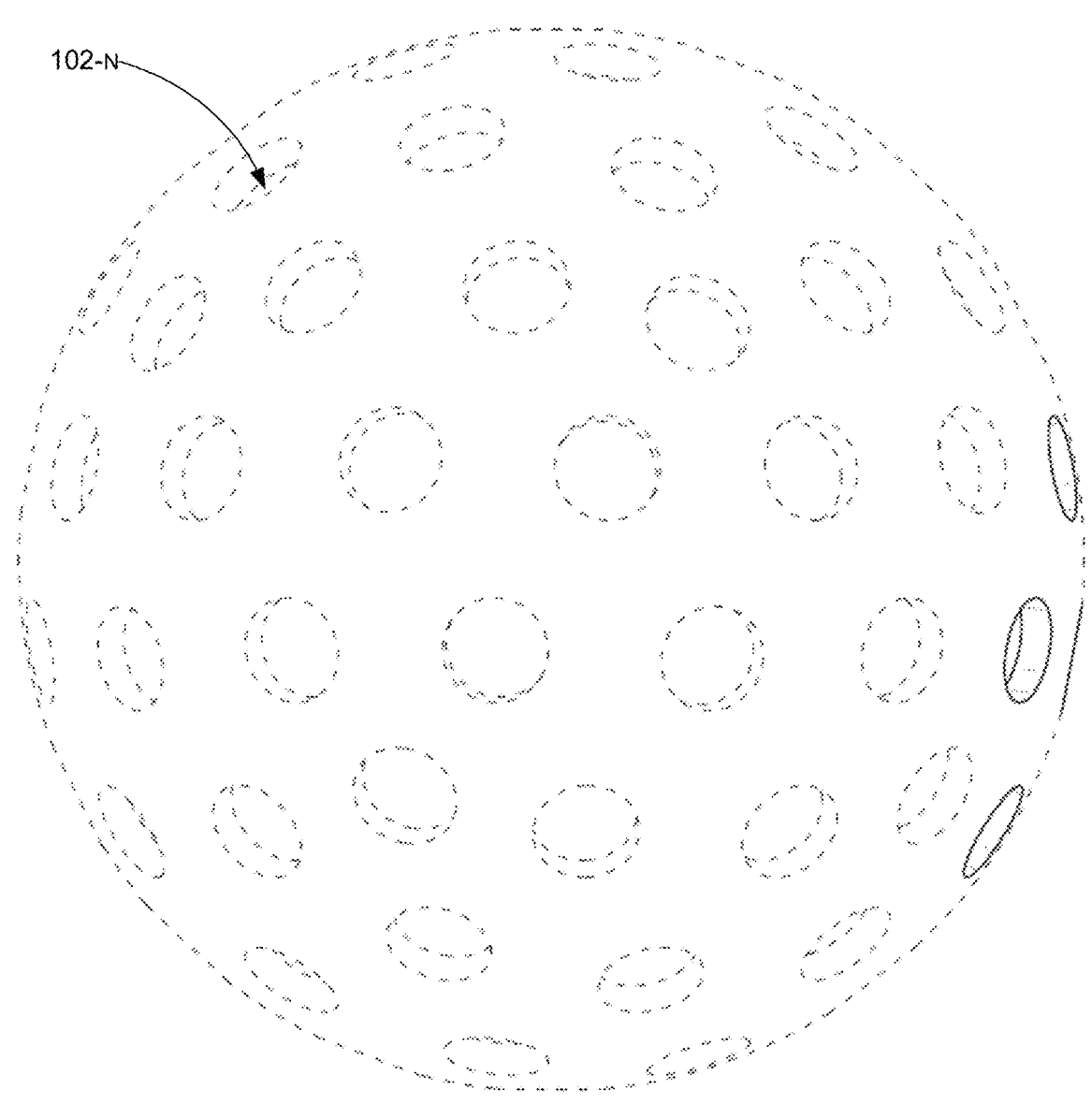
Figure 16:
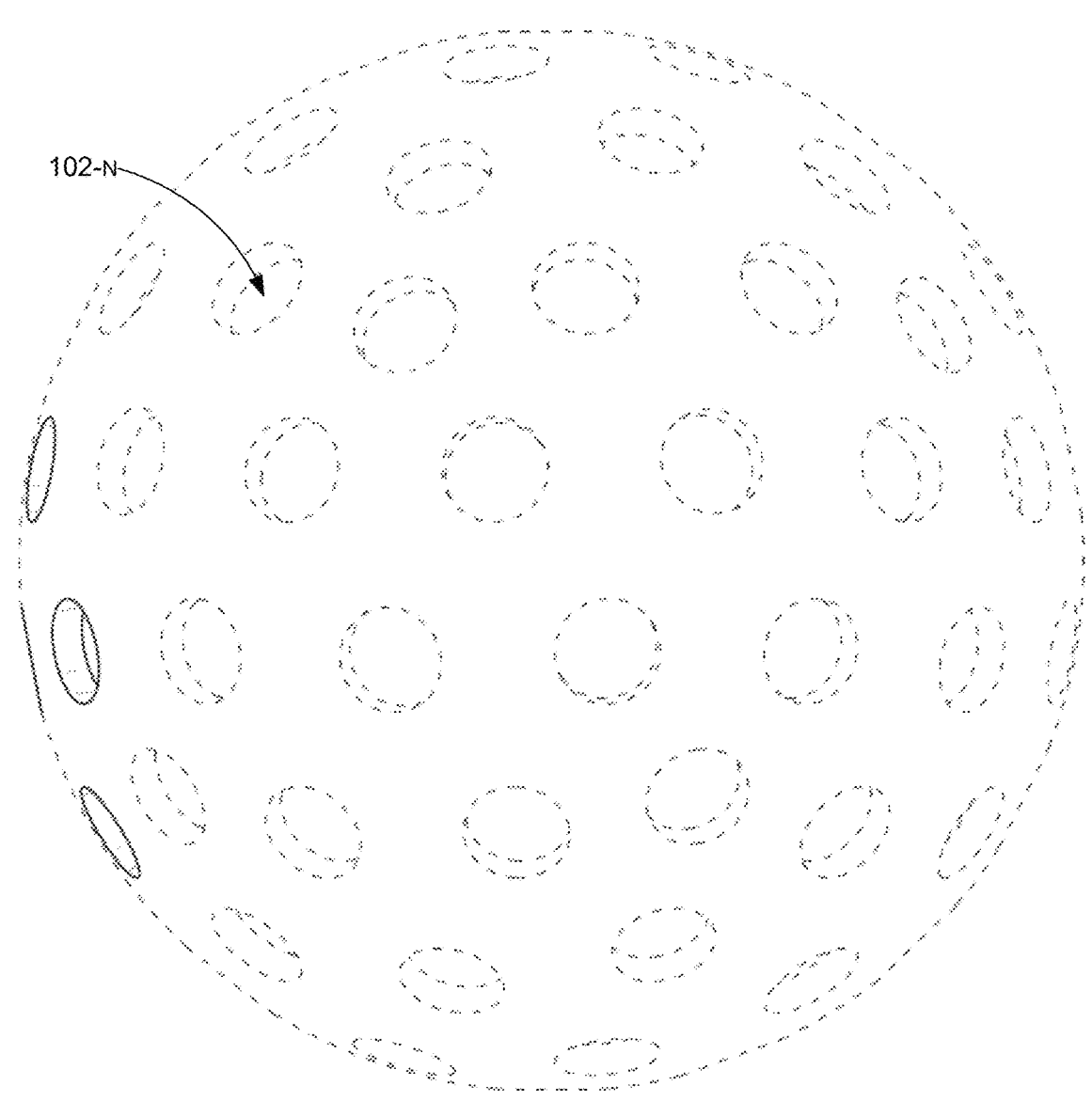
Figure 17:
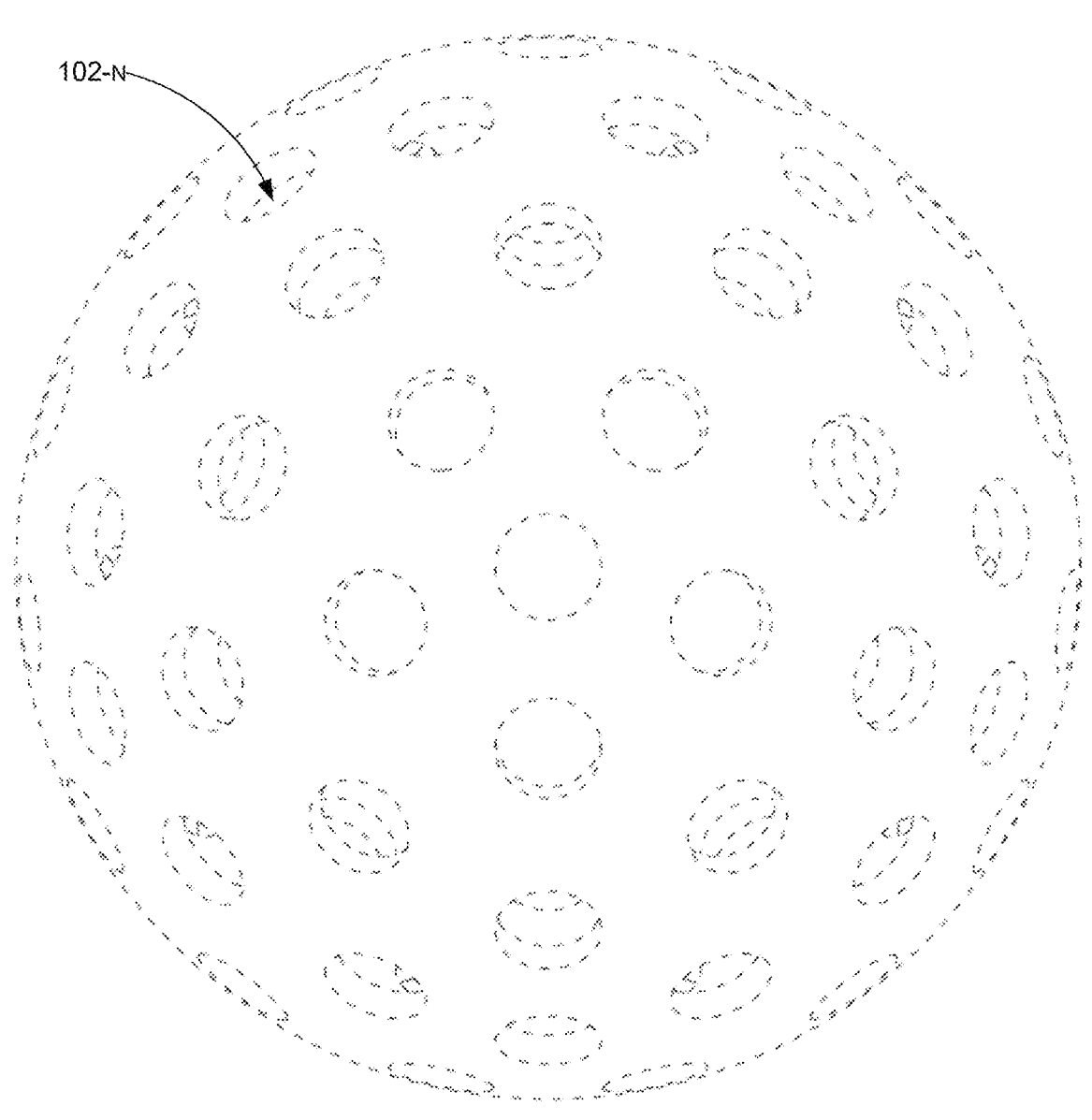
Figure 18:
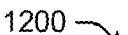
Figure 18:
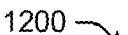

FIG. 4 illustrates a flow diagram of an example method 400 of forming a pickleball 100, according to an example of the principles described herein. The method 400 of FIG. 4 may include forming a spherical shell at 402. In the example of FIG. 4, the entirety of the spherical shell may be formed as a single piece and may not require the mechanical fastening, adhesive bonding, or welding processes described herein since the two hemispheres are not formed individually. Further, at 404, the method 400 may include forming apertures 102 in the spherical shell based at least in part on a N-frequency tessellation of the spherical shell as described herein. In one example, at least 42 apertures may be defined in the spherical shell based at least in part on a N-frequency tessellation of the spherical shell as described herein. In one example, the forming of the at least 42 apertures may be accomplished via a mold that produces the apertures during the formation of the spherical shell. In one example, the forming of the at least 42 apertures may be accomplished via a material subtraction process such as, for example, cutting, drilling, etching, or other process that may be used to remove material from the spherical shell at the points along the spherical shell as determined by the N-frequency tessellation of the spherical shell as described herein. Further, in one example, the spherical shell may be formed through injection molding processes, rotomolding processes, or other processes.

FIGS. 5 through 11 illustrate a number of perspective views of a pickleball 500 including a plurality of apertures defined therein, according to an example of the principles described herein. The example pickleball 500 of FIGS. 5 through 11 includes a number of apertures 102 formed in the hollow, spherical shell of the pickleball 500. In the example of FIGS. 5 through 11, the pickleball 500 may include 92 apertures 102 with a pentagon and/or hexagon layout defined by an N-frequency tessellation as described herein. In the example pickleball 500 of FIGS. 5 through 11 may have apertures 102 that have diameters of approximately 7.5 mm. However, the apertures 102 may have any diameter and/or any number of classes of apertures with each class having different diameters as described herein. Although some lines are depicted in FIGS. 5 through 11 are depicted in dashed lines, any lines may be presented in solid lines and the solid lines may be used to depict the pentagon layout of apertures 102 in the example of FIGS. 5 through 11.

FIGS. 12 through 18 illustrate a number of perspective views of a pickleball 1200 including a plurality of apertures defined therein, according to an example of the principles described herein. The example pickleball 1200 of FIGS. 12 through 18 includes a number of apertures 102 formed in the hollow, spherical shell of the pickleball 1200. In the example of FIGS. 12 through 18, the pickleball 1200 may include 92 apertures 102 with a hexagon and/or pentagon layout defined by an N-frequency tessellation as described herein. In the example pickleball 1200 of FIGS. 12 through 18 may have apertures 102 that have diameters of approximately 7.5 mm. However, the apertures 102 may have any diameter and/or any number of classes of apertures with each class having different diameters as described herein. Although some lines are depicted in FIGS. 12 through 18 are depicted in dashed lines, any lines may be presented in solid lines and the solid lines are used to depict the hexagon layout of apertures 102 in the example of FIGS. 12 through 18.

In the examples described herein, any number of apertures 102 may be defined within the pickleball 100, 500, 1200. Further, the apertures 102 may include any number of classes of apertures 102 that have different diameters.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

CONCLUSION

The examples described herein provide a pickleball that has increased playability performance and reduced noise when struck. The method disclosed in the present invention to reduce noise of the pickleball may be accomplished by one or more of adjusting the number of apertures, the sizes of the apertures, the orientations of apertures, the ball weight, and/or the material.

In one example, the ball may include 92 apertures that have reduced noise compared to a pickleball ball with 40 apertures, with the pickleballs being made of the same material, aperture sizes, and weight specifications as compared to other pickleballs. Further, in one example, the pickleball may include at least 42 apertures that will have reduced noise compared to a pickleball ball with 40 apertures.

In one example, the pickleballs may include apertures with center-points substantially located at the intersections of a three-frequency geodesic pattern. In one example, this three-frequency geodesic pattern may produce a ball with 92 apertures.

Further, in one example, a pickleball having 92 apertures may include an equator 108 that does not touch any apertures that enables the production of the pickleballs via injection molding manufacturing processes. In this example, two half-ball pieces may be injection molded and welded or attached forming a whole ball with a seam. The seam may define the equator 108 that does not touch any apertures.

Further, in one example, the aperture sizes may be adjusted and/or apertures having varying sizes may be defined in the pickleball in order to minimize noise. Still further, the orientations and spacing between the apertures and/or the layout of the apertures may be defined to minimize noise. Further, the pickleball may be formed to decrease an amount of ball material contacting the paddle and play surfaces in order to further reduce noise.

The pickleball may be formed to reduce noise while retaining ball performance. In one example, the structure of the ball may be weakened in order to soften the noise. Further, in one example, the weight of the pickleball may be minimized in order to reduce noise. Still further, the pickleball may be formed such that sounds from the ball may be caused to reflect or reverberate in order to reduce the noise.

In one example, the material from which the pickleball is made that minimizes noise may be formulated in order to reduce noise. These materials may include, for example, but not limited to, thermoplastic elastomers (TPE), ethylene-vinyl acetate (EVA), polypropylene (PP), polyethylene (PE), low-density polyethylene (LDPE), high-density polyethylene (HDPE), linear low-density polyethylene (LLDPE), polyurethane (PU), thermoplastic polyurethane (TPU), other polymers, and combinations thereof with the intent to minimize noise.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A ball comprising:

a spherical shell;

first apertures formed in the spherical shell, individual apertures of the first apertures being formed in the spherical shell at an intersection of first lines of a geodesic polyhedron, the first lines including a first length; and second apertures formed in the spherical shell, individual apertures of the second apertures being formed in the spherical shell at an intersection of second lines of the geodesic polyhedron, the second lines including a second length that is different than the first length.

2. The ball of claim 1, wherein:

the first apertures have a first diameter; and the second apertures have a second diameter different than the first diameter.

3. The ball of claim 2, wherein:

the first diameter is based at least in part on the first length; and the second diameter is based at least in part on the second length.

4. The ball of claim 1, further comprising:

third apertures formed in the spherical shell, individual apertures of the third apertures being formed in the spherical shell at an intersection of:

one or more of the first lines, one or more of the second lines, and one or more third lines, the one or more third lines including a third length that is different than the second length.

5. The ball of claim 4, wherein:

the first apertures have a first diameter;

the second apertures have a second diameter less than the first diameter; and the third apertures have a third diameter less than the first diameter and greater than the second diameter.

6. The ball of claim 1, wherein:

edges of the individual apertures of the first apertures are spaced apart from one another by a distance;

edges of the individual apertures of the second apertures are spaced apart from one another by the distance; and the edges of the individual apertures of the first apertures and the edges of the individual apertures of the second apertures are spaced apart by the distance.

7. A ball comprising:

a hollow sphere; and apertures formed in the hollow sphere based at least in part on a N-frequency tessellation of the hollow sphere, the apertures being disposed at an intersection of line segments that form the N-frequency tessellation, the line segments including at least:

a first line segment having a first length, and a second line segment having a second length different than the first length.

8. The ball of claim 7, wherein the apertures include:

first apertures having a first size; and second apertures having a second size different than the first size.

9. The ball of claim 8, wherein:

the first apertures are disposed at an intersection of at least three first line segments; and the second apertures are disposed at an intersection of at least three second line segments.

10. The ball of claim 9, wherein:

the apertures include third apertures having a third size different than the second size;

the line segments include a third line segment having a third length different than the second length; and the third apertures are disposed at an intersection of at least two first line segments, at least two second line segments, and at least two third line segments.

11. The ball of claim 8, wherein the apertures include third apertures having a third size different than the second size and the first size.

12. The ball of claim 7, wherein the line segments include a third line segment having a third length different than the second length.

13. The ball of claim 7, wherein the N-frequency tessellation of the hollow sphere is a 3-frequency tessellation of the hollow sphere.

14. The ball of claim 7, wherein the apertures have an equal spacing between edges of adjacent apertures.

15. A ball comprising:

a spherical shell; and apertures defined in the spherical shell, the apertures being disposed at an intersection of line segments of a geodesic polyhedron, the apertures including at least:

first apertures with a first diameter, and second apertures with a second diameter different than the first diameter, wherein the apertures have an equal spacing between edges of adjacent apertures.

16. The ball of claim 15, wherein the apertures are formed in the spherical shell based at least in part on an N-frequency tessellation of the spherical shell.

17. The ball of claim 16, wherein the N-frequency tessellation is a 3-frequency tessellation of the spherical shell.

18. The ball of claim 16, wherein the line segments include at least:

a first line segment with a first length, and a second line segment with a second length different than the first length.

19. The ball of claim 18, wherein the line segments include a third line segment with a third length different than the second length.

20. The ball of claim 15, wherein the apertures include third apertures with a third diameter different than the second diameter and the first diameter.

* * * * *